Figure 1:
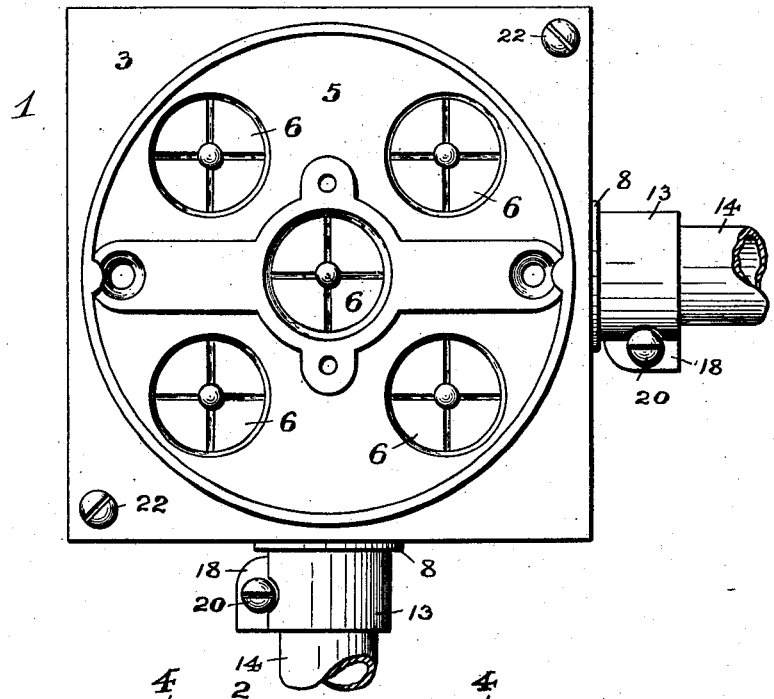

No. 693,398. Patented Feb. 18, 1902.
H. ILL.
CONDUIT BUSHING.
(Application filed Nov. 23, 1901.)

(No Model.) 2 Sheets—Sheet I.

WITNESSES:
Geo. D. Richards
Marcy Z. Tunstall

INVENTOR:
HENRY ILL,
BY
Fred C. Fraentzel,
ATTORNEY

THE NORRIS PETERS CO., PHOTO-LITHO., WASHINGTON, D. C.

No. 693,398. Patented Feb. 18, 1902.
H. ILL.
CONDUIT BUSHING.
(Application filed Nov. 23, 1901.)
(No Model.) 2 Sheets—Sheet 2.
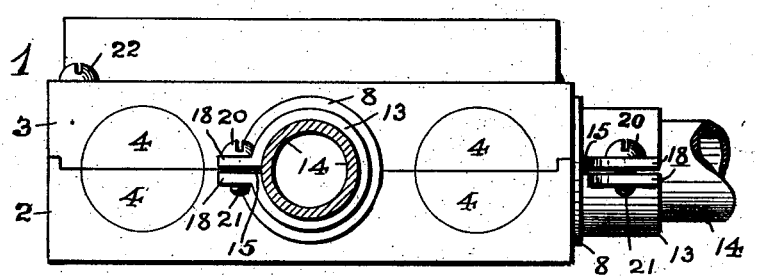
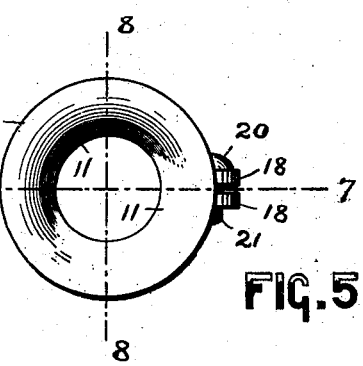
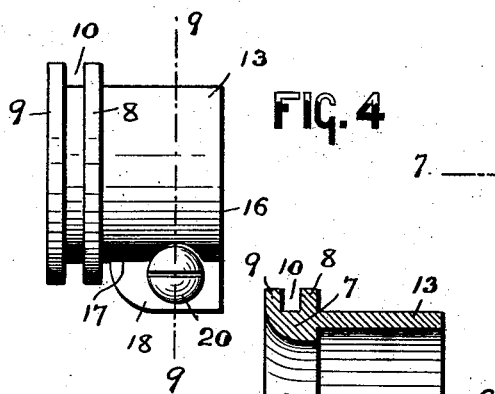
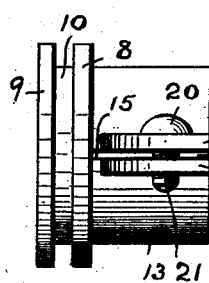
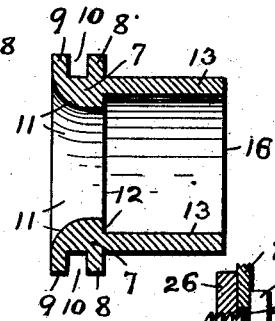
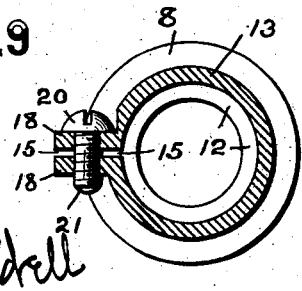
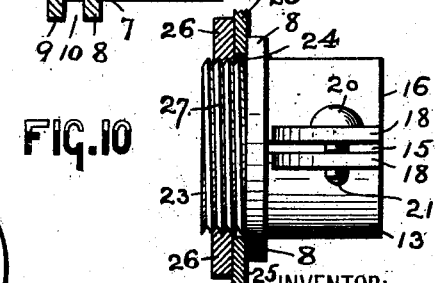
WITNESSES:
Geo. A. Richards
Marcy G. Truesdell
INVENTOR:
HENRY ILL.
BY
Fred'k C. Fraentzel,
ATTORNEY
THE NORRIS PETERS CO., PHOTO-LITHO., WASHINGTON, D. C.

UNITED STATES PATENT OFFICE.

HENRY ILL, OF NEWARK, NEW JERSEY.

CONDUIT-BUSHING.

SPECIFICATION forming part of Letters Patent No. 693,398, dated February 18, 1902.

Application filed November 23, 1901. Serial No. 83,378. (No model.)

*To all whom it may concern:*

Be it known that I, HENRY ILL, a citizen of the United States, residing at Newark, in the county of Essex and State of New Jersey, have invented certain new and useful Improvements in Conduit-Bushings; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention has reference to a novel construction of conduit bushing or nipple adapted to be used with electric outlet or junction boxes and the conduit-pipes leading into the same and with which the said pipes are connected by means of the conduit bushing or nipple; and the primary object of this invention is to provide a conduit bushing or nipple having a round and smooth flaring end and a corresponding outlet for the conduit pipe or tubing employed for the carrying of electric wires to allow the wires to be drawn in and out without fraying or wearing off the insulation of the wires.

The invention has for its further object to provide a novel form and construction of outlet or conduit bushing or nipple which can be arranged in a suitable opening in the side or bottom of an outlet or junction box and is made with a slotted sleeve and clamping means for arranging the end of a conduit pipe or tube in said sleeve and securing it in its fixed position, by said clamping means, thereby dispensing with an internal screw-thread within the sleeve of the bushing or nipple for the reception of the conduit-pipe, and, furthermore, doing away with the use of screw-threads upon the end of the conduit pipe or tubing and avoiding the use of an additional union or coupling, as is now ordinarily the case.

The invention has for its further object to provide a simple and inexpensive construction of conduit bushing or nipple which can be easily and quickly arranged in its proper position in the opening of the outlet or junction box and to which the end of a conduit-pipe can be rapidly connected and through which the wires can be pulled without any danger of fraying or wearing off the insulation, thereby avoiding all possibility of short-circuits and consequent loss of electricity and danger from fire to the building.

My present invention therefore consists in the novel construction of conduit bushing or nipple to be hereinafter fully set forth and in the several novel arrangements and combinations of the various parts thereof, either with or without a conduit-pipe of the construction herein specified, all of which will be fully described in the following specification of my invention and then finally embodied in the clauses of the claim which form a part of this specification.

The invention is clearly illustrated in the accompanying drawings, in which—

Figure 2:
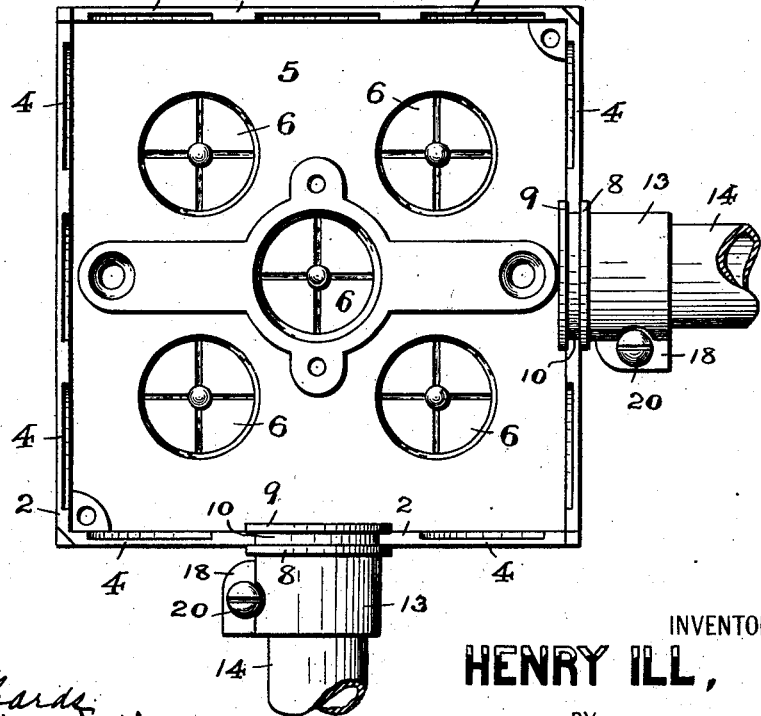

Figure 1 is a plan or top view of one form of sectional outlet or junction box, being of that type of box comprising a lower and an upper half which are separably connected, said view illustrating in connection with this form of box one form of conduit bushing or nipple and a portion of a conduit pipe or tubing connected therewith, all embodying the principles of this invention; and Fig. 2 is a top or plan view of the lower half of the said outlet or junction box, showing a pair of the weakened portions of the said half, which form the outlet or inlet openings to the box, broken away, and my novel form of conduit bushing or nipple arranged in position in the said "broken-away" parts, with the ends of conduit-pipes connected with the said bushings or nipples. Fig. 3 is a side elevation of an outlet or junction box of the construction represented in said Figs. 1 and 2, with the conduit-bushings and portions of conduit-pipes connected with said bushings. Fig. 4 is a top view of the conduit bushing or nipple before it is connected with an outlet-box. Fig. 5 is an end view of the rounded or flaring end of the same, and Fig. 6 is a side view of the said conduit-bushing. Fig. 7 is a horizontal section of the conduit-bushing, said section being taken on line 7 7 in Fig. 5. Fig. 8 is a vertical section of the bushing, said section being taken on line 8 8 in said Fig. 5; and Fig. 9 is a cross-section of the said bushing, said section being taken on line 9 9 in Fig. 4. Fig. 10 is a side view of a modified form of construction of conduit bushing or nipple which still embodies the principles of my present invention, illustrating the said bushing provided with a screw-threaded portion arranged in an opening in the side of an outlet or junction box, a portion of said side of the box being represented in vertical section, and a nut screwed upon said screw-threaded portion against the inner surface of the said side of the box, said nut being shown in vertical section.

Similar characters of reference are employed in all of the said above-described views to indicate corresponding parts.

Referring to Figs. 1, 2, and 3 of the drawings, the reference character 1 indicates one form of outlet or junction box, that herein shown being a sectional outlet-box and consisting of a lower half or section 2 and an upper half or section 3. Each half of the box is formed in its sides with weakened portions 4 and in its base 5 with weakened portions 6, all of which are adapted to be broken away in the usual manner for forming suitable inlet or outlet openings in which the conduit-bushings are to be arranged in the manner to be presently described and for the purpose of rapidly and easily connecting the ends of conduit pipes or tubes directly over the broken-away portions of the said box.

Of course it will be understood that my novel construction of conduit bushing or nipple embodying the various features of my present invention may also be employed with any other suitable forms of outlet or junction boxes.

The preferred form of construction of conduit bushing or nipple is illustrated more particularly in Figs. 4 to 9 of the drawings, and the said bushing consists, essentially, of a metallic member 7, the same forming the main body of the bushing and being provided on its outer cylindrical surface with a pair of annular flanges 8 and 9 and an annular groove or recess 10 between the said flanges 8 and 9, as clearly illustrated. The said body 7 is formed with an enlarged and rounded or flaring mouth 11 and an internally-arranged annular shoulder or offset 12, as clearly illustrated in Figs. 7 and 8 of the drawings. Extending rearwardly from the said main body portion 7 and from the said inner annular shoulder or offset 12 is a tubularly-shaped flange or sleeve 13, constructed for the reception of the end of a suitable conduit pipe or tube 14. The said flange or sleeve 13 is made with a slot or saw-cut 15, which extends in a longitudinal direction, usually from the free edge 16 of the said flange or sleeve 13 to the edge 17 of the previously-mentioned annular shoulder 8; but of course it will be understood that the length of this slot or saw-cut may be varied, if desired. Contiguous with the longitudinally-extending edges of the said slot or saw-cut 15 are a pair of ears or lugs 18, of any desirable shape and configuration, the said ears forming an integral part of the outer cylindrical surface of the said flange or sleeve 13 and extending in lateral directions therefrom, substantially as illustrated in the several figures of the drawings. The said ears or lugs 18 are each provided with oppositely-placed perforations 19, one of said perforations being formed with a screw-thread for receiving the screw portion 21 of a screw 20, which has its upper portion rotatively arranged in the plain cylindrical hole of the other ear or lug 18, as clearly illustrated in Fig. 9 of the drawings. This form and construction of conduit-nipple is especially adapted for use with sectional outlet or junction boxes which are made in halves, comprising a lower section and an upper section, the two sections being operatively connected to form the box 1 by means of the screws 22, as illustrated in Figs. 1 and 3.

To secure the conduit bushing or nipple in position in one of the inlet or outlet openings of the outlet-box 1, all that is necessary is to separate the two box-sections 2 and 3 by unscrewing the said screws 22 and breaking away the respective weakened portions 4 at the desired points in the box where it is intended to place and secure in position the said conduit-bushing. After the opening has been made the two sections of the box 1 are arranged in the annular groove 10 of the bushing, with the annular flange 8 placed against the outer face, and the annular flange 9 placed against the inner face, of the side of the box in which the said opening has been made. The two box-sections 2 and 3 are then again secured together by means of the screws 22, and the said conduit bushing or nipple is held in its operative position in the side of the box with the flaring mouth 11 of the bushing extending into the inner portion of the box 1, and the said flange or sleeve 13 projecting from the side of the box 1 for the reception of the end portion of the pipe or tubing 14, as clearly indicated in Figs. 1, 2, and 3 of the drawings. The plain cylindrical end of the pipe or tubing 14 is then easily slipped into the inner cylindrical portion of the said sleeve or flange 13, so that the edge of the pipe will abut directly against the annular shoulder 12 of the body 7 of the bushing, whereby an unobstructed central duct will be provided between the inner portion of the said body 7 of the conduit-bushing and the inner portion of the said pipe or tube 14, as will be clearly evident. A turn or two upon the head of the screw 20 by means of a screw-driver will cause the two ears or lugs 18, connected with the said sleeve 13, to be brought closer together, and the inner cylindrical surface of the said sleeve will be made to firmly clamp or bind against the plain outer cylindrical surface of the inserted end portion of the pipe 14, and thereby the said pipe will be fixed in its operative position in the said sleeve or flange 13 and against any possible displacement therefrom unless the said clamping-sleeve 13 is unloosened by unscrewing the said screw 20.

It will be evident from the above description of my present invention that I have devised a simply-constructed and an inexpensive construction of conduit bushing or nipple which can be quickly secured in its operative position in an opening of an outlet or junction box, and in which, since the arrangement of an internal screw-thread within the sleeve or flange 13 of the bushing has been dispensed with, the plain cylindrical end of a conduit pipe or tube can be more readily arranged in the sleeve of the conduit-bushing and positively held in its secured position by means of the clamping device employed in connection with the said bushing.

When it is desired to use my novel construction of conduit bushing or nipple with an outlet or junction box which is not made in halves, the box being made with side plates 25, in which there is an opening or openings 24, as indicated in Fig. 10 of the drawings, then the annular groove 10 and the flange 9 of the bushing are dispensed with and the main body of the bushing is made with a flanged portion 23, which is provided with an external screw-thread 27, as shown in said Fig. 10. The said screw-threaded flange 23 is inserted through the opening 24 in the side 25 of the box, as shown in said figure, and the bushing is then secured in its operative position by means of a suitable nut 26, which is screwed upon the screw-thread 27 and against the inner surface of the side 25, all of which is clearly represented and will be understood from an inspection of the said Fig. 10.

I am aware that changes may be made in the several arrangements and combinations of the various parts comprising my novel form and construction of conduit-bushing without departing from the scope of my present invention. Hence I do not limit my invention to the exact arrangements and combinations of the parts as described in the specification and as illustrated in the accompanying drawings, nor do I confine myself to the exact details of the construction of said parts.

Having thus described my invention, what I claim is—

1. A conduit-bushing, made independent from and adapted to be separably connected with an outlet-box, comprising, a main body having a central duct for the reception of electric wires, means on said main body for securing the one end of said body in an opening in such outlet-box, a pipe-receiving sleeve connected with said body capable of expansion and contraction, and means connected with said sleeve for contracting the same about the end of an inserted conduit-pipe and thereby securing the end of the pipe in a fixed position in said sleeve substantially as and for the purposes set forth.

2. A conduit-bushing, made independent from and adapted to be separably connected with an outlet-box, comprising, a main body having a central duct for the reception of electric wires, means on said main body for securing the one end of said body in an opening in such outlet-box, a slotted pipe-receiving sleeve connected with said body capable of expansion and contraction, and a clamping device on said sleeve located in juxtaposition to said slot for clamping the said sleeve in a fixed position about the end of a conduit-pipe, substantially as and for the purposes set forth.

3. A conduit-bushing, made independent from and adapted to be separably connected with an outlet-box, comprising, a main body having a central duct for the reception of electric wires, means on said main body for securing the one end of said body in an opening in such outlet-box, a slotted pipe-receiving sleeve connected with said body capable of expansion and contraction, a pair of perforated ears connected with said sleeve, said ears being arranged on opposite sides of said slot, and one of the perforations in one of said ears being provided with a screw-thread, and a screw in said perforated ears, substantially as and for the purposes set forth.

4. A conduit-bushing, made independent from and adapted to be separably connected with an outlet-box, comprising, a main body having a central duct for the reception of electric wires, means on said main body for securing the one end of said body in an opening in such outlet-box, said central duct having a flaring mouth and an internally-arranged annular shoulder against which the end of a conduit-pipe can be arranged, a pipe-receiving sleeve connected with said body capable of expansion and contraction, and means connected with said sleeve for contracting the same about the end of the inserted conduit-pipe and thereby securing the end of the pipe in a fixed position in said sleeve, substantially as and for the purposes set forth.

5. A conduit-bushing, made independent from and adapted to be separably connected with an outlet-box, comprising, a main body having a central duct for the reception of electric wires, means on said main body for securing the one end of said body in an opening in such outlet-box, said central duct having a flaring mouth and an internally-arranged annular shoulder against which the end of a conduit-pipe can be arranged, a slotted pipe-receiving sleeve connected with said body capable of expansion and contraction, and a clamping device on said sleeve located in juxtaposition to said slot for clamping the said sleeve in a fixed position about the end of the conduit-pipe, substantially as and for the purposes set forth.

6. A conduit-bushing, made independent from and adapted to be separably connected with an outlet-box, comprising, a main body having a central duct for the reception of electric wires, means on said main body for securing the one end of said body in an opening in such outlet-box, said central duct having a flaring mouth and an internally-arranged annular shoulder against which the end of a conduit-pipe can be arranged, a slotted pipe-receiving sleeve connected with said body capable of expansion and contraction, a pair of perforated ears connected with said sleeve, said ears being arranged on opposite sides of said slot, and one of the perforations in one of said ears being provided with a screw-thread, and a screw in said perforated ears, substantially as and for the purposes set forth.

7. A conduit-bushing, comprising, a main body having a central duct for the reception of electric wires, a pair of externally-arranged shoulders on said main body, said shoulders forming an annular groove between them, a pipe-receiving sleeve connected with said body capable of expansion and contraction, and means connected with said sleeve for contracting the same about the end of an inserted conduit-pipe and thereby securing the end of the pipe in a fixed position in said sleeve, substantially as and for the purposes set forth.

8. A conduit-bushing, comprising, a main body having a central duct for the reception of electric wires, a pair of externally-arranged shoulders on said main body, said shoulders forming an annular groove between them, a slotted pipe-receiving sleeve connected with said body capable of expansion and contraction, and a clamping device on said sleeve located in juxtaposition to said slot for clamping the said sleeve in a fixed position about the end of a conduit-pipe, substantially as and for the purposes set forth.

9. A conduit-bushing, comprising, a main body having a central duct for the reception of electric wires, a pair of externally-arranged shoulders on said main body, said shoulders forming an annular groove between them, a slotted pipe-receiving sleeve connected with said body capable of expansion and contraction, a pair of perforated ears connected with said sleeve, said ears being arranged on opposite sides of said slot, and one of the perforations in one of said ears being provided with a screw-thread, and a screw in said perforated ears, substantially as and for the purposes set forth.

10. A conduit-bushing, comprising, a main body having a central duct for the reception of electric wires, said central duct having a flaring mouth, and an internally-arranged annular shoulder against which the end of a conduit-pipe can be arranged, a pair of externally-arranged annular shoulders on said main body, said shoulders forming an annular groove between them, a pipe-receiving sleeve connected with said body capable of expansion and contraction, and means connected with said sleeve for contracting the same about the end of the inserted conduit-pipe and thereby securing the end of the pipe in a fixed position in said sleeve, substantially as and for the purposes set forth.

11. A conduit-bushing, comprising, a main body having a central duct for the reception of electric wires, said central duct having a flaring mouth, and an internally-arranged annular shoulder against which the end of a conduit-pipe can be arranged, a pair of externally-arranged annular shoulders on said main body, said shoulders forming an annular groove between them, a slotted pipe-receiving sleeve connected with said body capable of expansion and contraction, and a clamping device on said sleeve located in juxtaposition to said slot for clamping the said sleeve in a fixed position about the end of the conduit-pipe, substantially as and for the purposes set forth.

12. A conduit-bushing, comprising, a main body having a central duct for the reception of electric wires, said central duct having a flaring mouth, and an internally-arranged annular shoulder against which the end of a conduit-pipe can be arranged, a pair of externally-arranged annular shoulders on said main body, said shoulders forming an annular groove between them, a slotted pipe-receiving sleeve connected with said body capable of expansion and contraction, a pair of perforated ears connected with said sleeve, said ears being arranged on opposite sides of said slot, and one of the perforations in one of said ears being provided with a screw-thread, and a screw in said perforated ears, substantially as and for the purposes set forth.

In testimony that I claim the invention set forth above I have hereunto set my hand this 22d day of November, 1901.

HENRY ILL.

Witnesses:
 FREDK. C. FRAENTZEL,
 GEO. D. RICHARDS.